(12) United States Patent
Epshteyn et al.

(10) Patent No.: US 12,286,533 B2
(45) Date of Patent: Apr. 29, 2025

(54) CARBON PHOSPHONITRIDE POLYMER ADDITIVES

(71) Applicant: The Government of the United States of America, as represented by the Secretary of the Navy, Arlington, VA (US)

(72) Inventors: Albert Epshteyn, College Park, MD (US); Matthew Laskoski, Springfield, VA (US); Brian Chaloux, Alexandria, VA (US); Tristan Butler, Alexandria, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 453 days.

(21) Appl. No.: 17/734,921

(22) Filed: May 2, 2022

(65) Prior Publication Data

US 2022/0356348 A1    Nov. 10, 2022

Related U.S. Application Data

(60) Provisional application No. 63/184,232, filed on May 5, 2021.

(51) Int. Cl.
| | | |
|---|---|---|
| *C08L 71/12* | (2006.01) | |
| *C08K 5/50* | (2006.01) | |
| *C08L 63/00* | (2006.01) | |
| *C08L 79/00* | (2006.01) | |

(52) U.S. Cl.
CPC ............. *C08L 71/123* (2013.01); *C08K 5/50* (2013.01); *C08L 63/00* (2013.01); *C08L 79/00* (2013.01)

(58) Field of Classification Search
CPC ........ C08L 71/123; C08L 63/00; C08L 79/00; C08K 5/50
See application file for complete search history.

(56) References Cited

U.S. PATENT DOCUMENTS

| | | |
|---|---|---|
| 9,409,936 B2 | 8/2016 | Epshteyn et al. |
| 9,567,359 B2 | 2/2017 | Epshteyn et al. |
| 10,249,403 B2 | 4/2019 | Epshteyn et al. |
| 10,510,458 B2 | 12/2019 | Epshteyn et al. |
| 2016/0297841 A1* | 10/2016 | Epshteyn .............. C01B 21/097 |
| 2022/0048934 A1 | 2/2022 | Chaloux et al. |

FOREIGN PATENT DOCUMENTS

CN    110066493 A  *  7/2019  ............. B32B 15/14

OTHER PUBLICATIONS

CN 110066493 Machine Translation (Year: 2019).*

* cited by examiner

*Primary Examiner* — Megan McCulley
*Assistant Examiner* — Caitlin Norine Illing
(74) *Attorney, Agent, or Firm* — US Naval Research Laboratory; Fariborz Moazzam

(57) ABSTRACT

Carbon phosphonitride (CPN) including tricyanophosphine ($P(CN)_3$), its pre-polymer (CPN-PP), and/or solid CPN ($C_3N_3P$) can serve as a useful additive for thermoset resins, resulting in improved thermal and mechanical properties.

8 Claims, 5 Drawing Sheets

US 12,286,533 B2

CARBON PHOSPHONITRIDE POLYMER ADDITIVES

CROSS-REFERENCE TO RELATED APPLICATIONS

This application is related to U.S. Pat. Nos. 9,409,936, 9,567,359, 10,249,403 and 10,510,458, as well as U.S. Provisional Patent Application No. 63/066,700 filed Aug. 17, 2020. This application claims the benefit of U.S. Provisional Patent Application No. 63/184,232 filed May 5, 2021, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 112,232.

BACKGROUND

Carbon phosphonitrides (CPNs) are a subset of materials that contain carbon, nitrogen, and phosphorus. It was found that $P(CN)_3$ can "polymerize" or self-react into an extended solid material with attractive chemical and thermal resistance (see U.S. Pat. Nos. 9,409,936 and 9,567,359). Accordingly, CPNs mentioned herein can be prepared from the self-reaction of $P(CN)_3$. Heating $P(CN)_3$ slowly from 175° C. to 225° C. initiates a self-crosslinking reaction which forms an extended $C_3N_3P$ solid. However, reaction of $PCl_3$ in the presence of AgCN and $AgNO_3$ yields a partially crosslinked pre-polymer powder that is soluble in certain aprotic polar solvents, such as acetonitrile, glymes, etc., and can therefore be readily processed (termed CPN-PP and described in U.S. Provisional Patent Application No. 63/066,700 filed Aug. 17, 2020).

BRIEF SUMMARY

Described herein is the addition of various types/embodiments of carbon phosphonitride (CPN) into different resin systems (for example thermoset resins including epoxy, cyanate ester, phthalonitrile, etc.) in order to modulate/improve thermal and mechanical properties (for example, oxidation resistance, glass transition temperature, etc.). These CPN materials include tricyanophosphine ($P(CN)_3$), its pre-polymer (CPN-PP), and solid $CPN(C_3N_3P)$.

In one embodiment, a thermoset plastic comprises CPN present in a range of about 2% to about 49% by weight. For example, CPN can be present in a thermoset plastic at about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, or 49% by weight. In a particular group of embodiments, the CPN is present in a range of about 2% to about 40% by weight.

In another embodiment, a method of making a thermoset material includes combining a carbon phosphonitride (CPN) with a resin and casting this CPN-resin composite to cure into a thermoset material incorporating the CPN, wherein the CPN is present in a range of about 2% to about 40% by weight.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term carbon phosphonitride (CPN) refers to tricyanophosphine ($P(CN)_3$), its pre-polymer (CPN-PP), and/or solid $CPN(C_3N_3P)$ as taught by U.S. Pat. Nos. 9,409,936, 9,567,359, 10,249,403 and 10,510,458, as well as U.S. Provisional Patent Application No. 63/066,700 filed Aug. 17, 2020. CPN is free of, or nearly free of, elements other than carbon, phosphorus, nitrogen, so that such other elements are present only as minor contaminants if present at all, with the exception that the pre-polymer form CPN-PP may contain <20 wt. % oxygen and <5 wt. % silver or other metallic contaminants used as catalysts in its preparation.

Overview

CPN materials can be added to a variety of polymer resins in order to enhance the thermal and mechanical properties of the resin. The CPN additive can either be a homogeneous molecular additive soluble in the resin, or the CPN may be added as an insoluble powder. The following examples describe the fabrication of CPN/polymer hybrids and composites and evaluate the material performance relative to the original pure resin.

Example 1: Melt Mixed CPN-PP/BisA

Figure 1A:
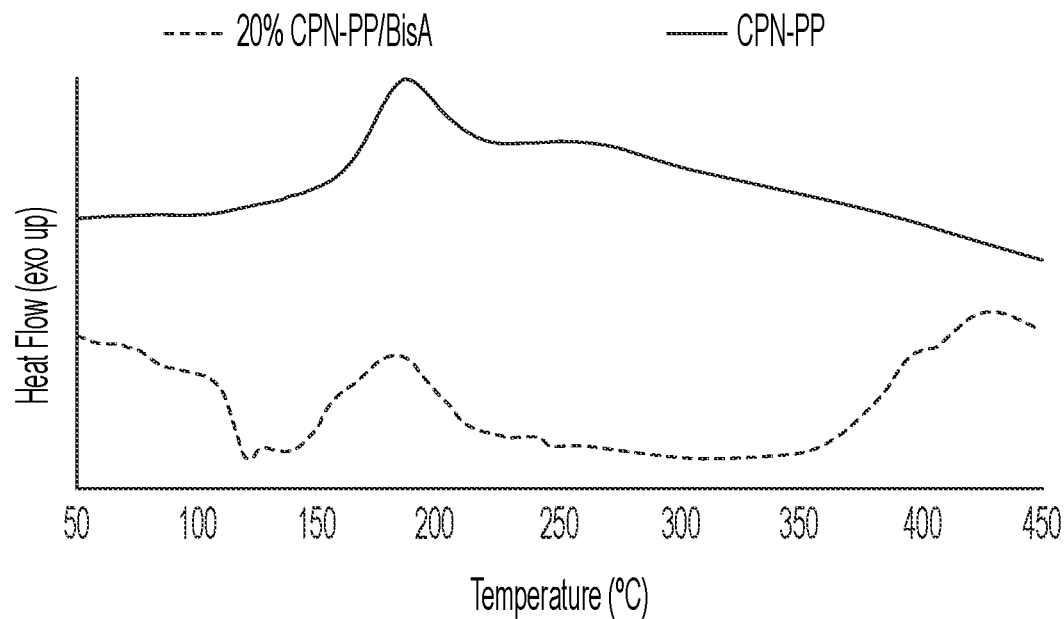
FIGS. 1A and 1B show data for pure CPN-PP and CPN-PP/BisA (bisphenol A-based phthalonitrile resin) mixtures.
Figure 1B:
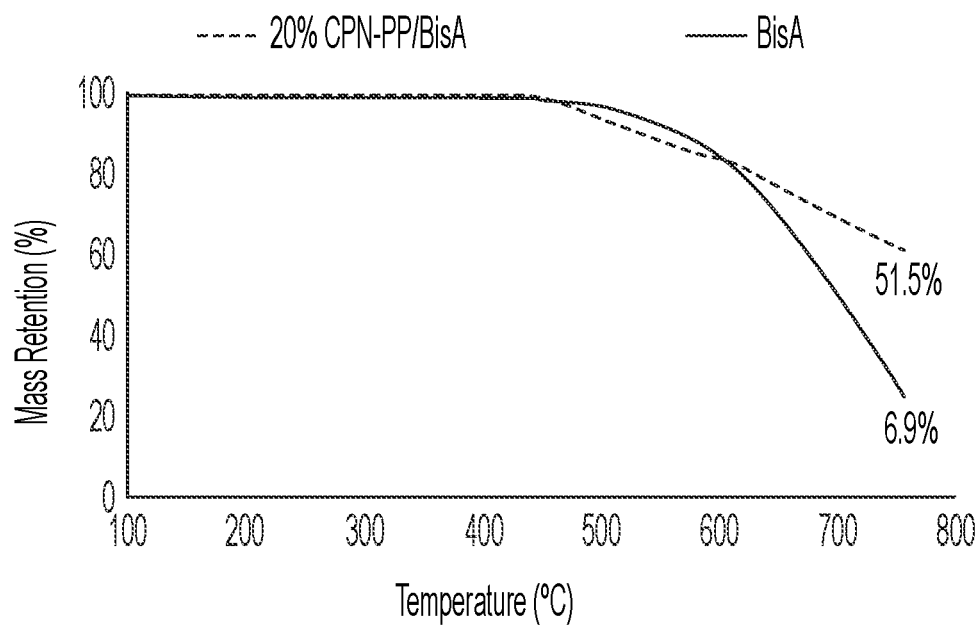

In a large metal pan, bisphenol A-based phthalonitrile resin (BisA, 250 g) was mixed with 3.0 wt. % of the amine curing additive 4,4'-bis(3-aminophenoxy)diphenyl sulfone (m-BAPS, 7.73 g) and heated at 200° C. for 60 min in order to partially crosslink the resin. A 20 wt. % CPN-PP/BisA mixture was then prepared by stirring CPN-PP (0.20 g) into molten BisA (0.80 g) in a nitrogen-filled glovebox. The mixture was then cooled to room temperature before conducting thermogravimetric analysis (TGA) and differential scanning calorimetry (DSC) tests (FIGS. 1A and 1B). Using the same procedure, BisA was prepared without any CPN additive for comparison.

FIG. 1A provides DSC thermograms of pure CPN-PP and CPN-PP/BisA mixture under $N_2$. It can be seen that heating induces a major exothermic transition at 187° C. and an exothermic shoulder around 260° C. Mixing with BisA shifts the major peak to 179° C. and results in the disappearance of the high temperature shoulder. Because DSC thermograms for CPN-PP and 20% CPN-PP/BisA composite exhibit such clear differences, it is likely that co-curing occurs when these pre-polymers are mixed.

In order to evaluate the effect of CPN-PP on the char yield of the parent resin, TGA thermograms were collected for the CPN-PP/BisA mixture as well as pure BisA by heating under air to 800° C. with a heating rate of 10° C./min. (FIG. 1B). For the pure BisA sample, precipitous degradation began when the sample reached 500° C. and only 6.9% of the initial mass was retained upon reaching 800° C. Conversely, the CPN-PP/BisA mixture started degrading at a lower temperature (475° C.) but exhibited more gradual mass loss, retaining 51.5% of its initial mass at 800° C.

Example 2: Solution Processed CPN-PP/BisA

In a nitrogen filled glove box, a CPN-PP/acetonitrile stock solution was made by dissolving 3.92 g of CPN-PP in 50 mL of acetonitrile. From that stock solution, 2.00 g of CPN-PP was added to a separate acetonitrile solution containing 8.00 g of unstaged BisA resin (BisA resin contained 3.0 wt. % bis(4-[3-aminophenoxy]phenyl)-sulfone) to form a 20 wt. % CPN-PP/BisA mixture. After stirring the solution for 1 hour, the acetonitrile was removed via vacuum distillation, and the resulting solid was transferred to an aluminum mold that contained three separate 10 mm×40 mm rectangular cavities. Equal portions of the CPN-PP/BisA powder were added to each cavity. The mold was then heated under vacuum at 175° C. for 3 hours in order to degas the samples. These samples were cured by heating at 240° C. for 12 hours followed by an additional heating step at 270° C. for 7 hours. The CPN-PP/BisA samples were removed from the mold and subsequently post-cured by heating to 380° C. over the course of 8 hours.

Figure 2:
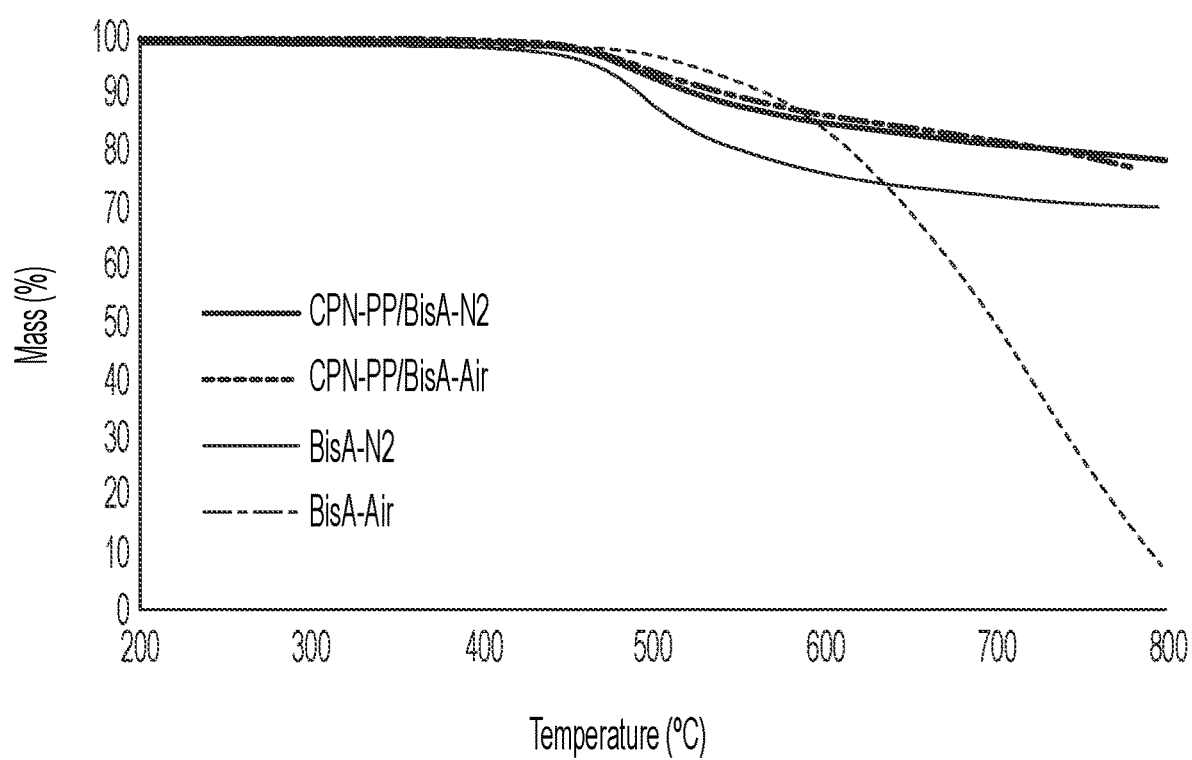
FIG. 2 provides TGA scans of 20% CPN-PP/BisA and pure BisA under air and nitrogen with a heating rate of 10° C./min.
Figure 3:
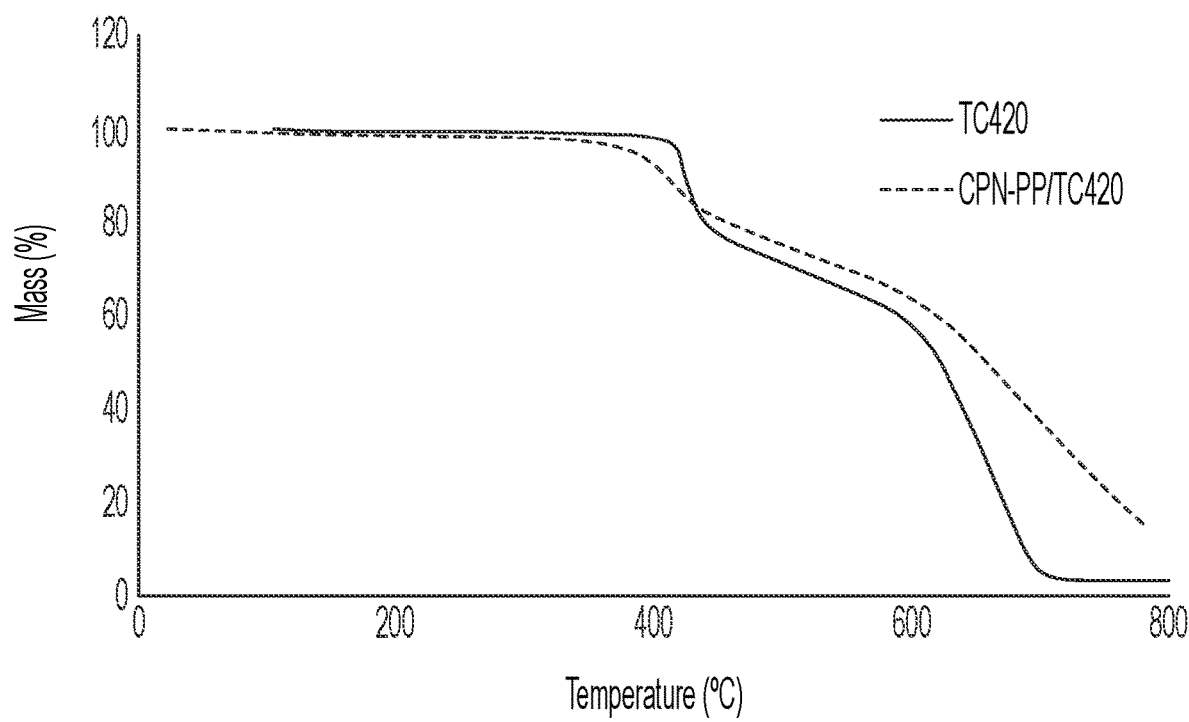
FIG. 3 presents TGA scans of 20% CPN-PP/CE (cyanate ester) and pure CE under air with a heating rate of 10° C./min.
Figure 4:
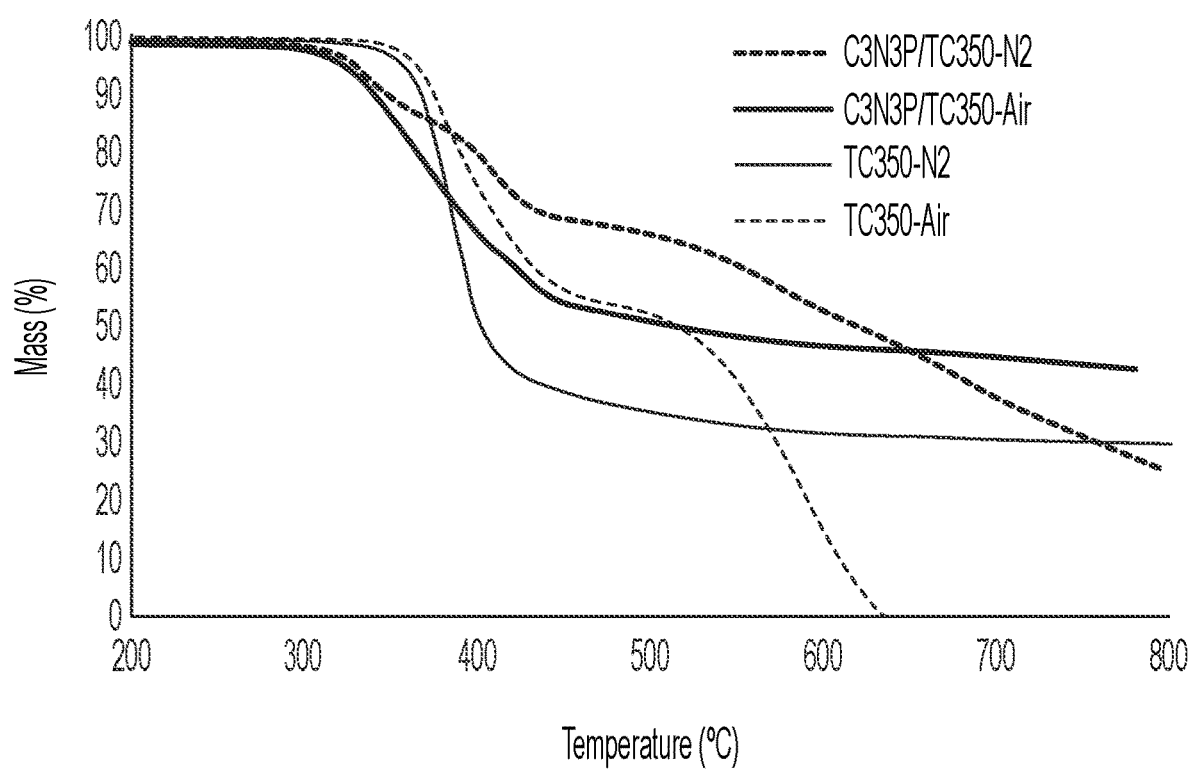
FIG. 4 depicts TGA scans of 10% CPN-PP/TC350 epoxy and pure TC350 epoxy under air with a heating rate of 10° C./min.

In order to evaluate the char forming ability of solution processed CPN-PP/BisA polymers, TGA scans to 800° C. were conducted under air and $N_2$ (FIG. 2). When heated under $N_2$, CPN-PP/BisA exhibited a slightly higher char yield than BisA (78.5% vs. 70%), however both were larger than those typically observed in commercially available thermosets. Comparison of the thermograms collected in air shows that inclusion of CPN-PP drastically improves the char yield of pure BisA under air (77% vs. 6.9%). Given that the mass retention of CPN-PP/BisA is considerably higher than the fraction of CPN-PP in the starting formulation, it is likely that incorporation of CPN-PP has a synergistic effect on the char formation of these samples.

Example 3: Solution Processed CPN-PP/CE (Cyanate Ester)

Using the CPN-PP/acetonitrile solution described in Example 2, CPN-PP (12 mL, 0.94 g) was added to 8.15 g of a TC420 cyanate ester resin dissolved in acetonitrile. The solvent was then removed via vacuum distillation and the resulting powder was loaded into a circular mold and degassed in a vacuum oven heated to 125° C. Additional curing was done by heating the samples at 225° C. for 2 hours before removal from the mold. Using the same procedure, pure TC420 resin samples were prepared without any CPN materials in order to gauge the effect of CPN-PP.

Thermal characterization of TC420 and CPN-PP/TC420 resins was done by collecting TGA scans under air. According to those measurements, pure TC420 resin exhibited two clear decomposition events beginning when the composite was heated above 400° C. and 600° C., respectively. When TC420 was heated above 700° C., virtually no mass remained. The thermograms of CPN-PP/TC420 showed similar behavior compared to its undoped counterpart in that two distinct decomposition pathways were observed. However, the rate of mass loss was much more gradual and some mass remained even when CPN-PP/TC420 was heated to 800° C.

Example 4: $C_3N_3P$/Epoxy

Prior to mixing with resin, $C_3N_3P$ (solid CPN powder) was ball milled as follows: under nitrogen, 15 grams of raw powder was loaded into a 50 mL stainless steel ball milling cup along with an equivalent weight of 5.0 mm diameter stainless steel milling media. The cup was sealed, brought out of the glove box, and cryogenically ball-milled at −196° C. for 4 hours total milling time. The total milling time was comprised of four cycles of 15 minutes of cool-down at 5 Hz, followed by 60 minutes of milling at 25 Hz, and an additional 15 minutes of warmup at 5 Hz (to prevent icing).

To prepare samples for thermal testing, the epoxy resin TC350 (7.15 g) was massed into a circular mold and degassed for 20 min under vacuum in an oven heated to 125° C. After degassing, ball milled $C_3N_3P$ (0.80 g) was mixed into molten epoxy resin before degassing the $C_3N_3P$/TC350 mixture for an additional hour, followed by curing at 175° C. for 3 hours. As in Example 3, the $C_3N_3P$/Epoxy mixture was post-cured by heating at 225° C. for two hours. For comparison, pure TC350 epoxy samples were made using the same heating procedure.

In order to demonstrate the effect of $C_3N_3P$ on the fire performance of TC350 epoxy resin, TGA scans were acquired under air and nitrogen for the $C_3N_3P$/TC350 mixture and the pure TC350 resin. When heated under $N_2$, $C_3N_3P$/TC350 retained 42.7% of its initial mass, compared to only 29.8% for pure TC350. Given that the difference in char yield (12.9%) is similar to the mass loading of $C_3N_3P$ (10 wt. %), it is likely that the improvement is mostly due to the presence of $C_3N_3P$. However the TGA scans collected under air indicate that no mass remained when TC350 was heated above 650° C. By comparison, $C_3N_3P$/TC350 exhibited more gradual mass loss and still retained 50% of its mass at 650° C. At 800° C., 24.7% of the composites initial mass remained.

Dynamic mechanical measurements were used to measure the storage modulus (G') and tan (δ) of rectangular a $C_3N_3P$/BisA composite and its pure BisA counterpart as a function of temperature. Comparison of G' shows that BisA initially has a larger storage modulus than $C_3N_3P$/BisA (1490 GPa vs. 1370 GPA). However, as the temperature is increased, the decrease in G' is more pronounced for BisA than $C_3N_3P$/BisA. These measurements suggest that incorporation of $C_3N_3P$ can prevent the erosion of storage modulus as a result of increasing temperature. Both composites have similar tan (δ) and indicate that there is no $T_g$ below 400° C.

Example 5: $C_3N_3P$/BisA

Ball milled $C_3N_3P$ powder (2.00 g, described in Example 4) and staged BisA resin (8.00 g, described in Example 1) were mixed together in air using a mortar and pestle. The resulting powder was added to an aluminum mold, which contained 3 separate 10 mm×40 mm rectangular cavities. Equal portions of the $C_3N_3P$/BisA powder were added to each cavity. The mold was then heated under vacuum at 175° C. for 3 hours in order to degas the samples. These samples were cured by heating at 240° C. for 12 hours followed by an additional heating step at 270° C. for 7 hours. The CPN-PP/BisA samples were removed from the mold and subsequently post-cured by heating to 380° C. over the course of 8 hours.

Figure 5A:
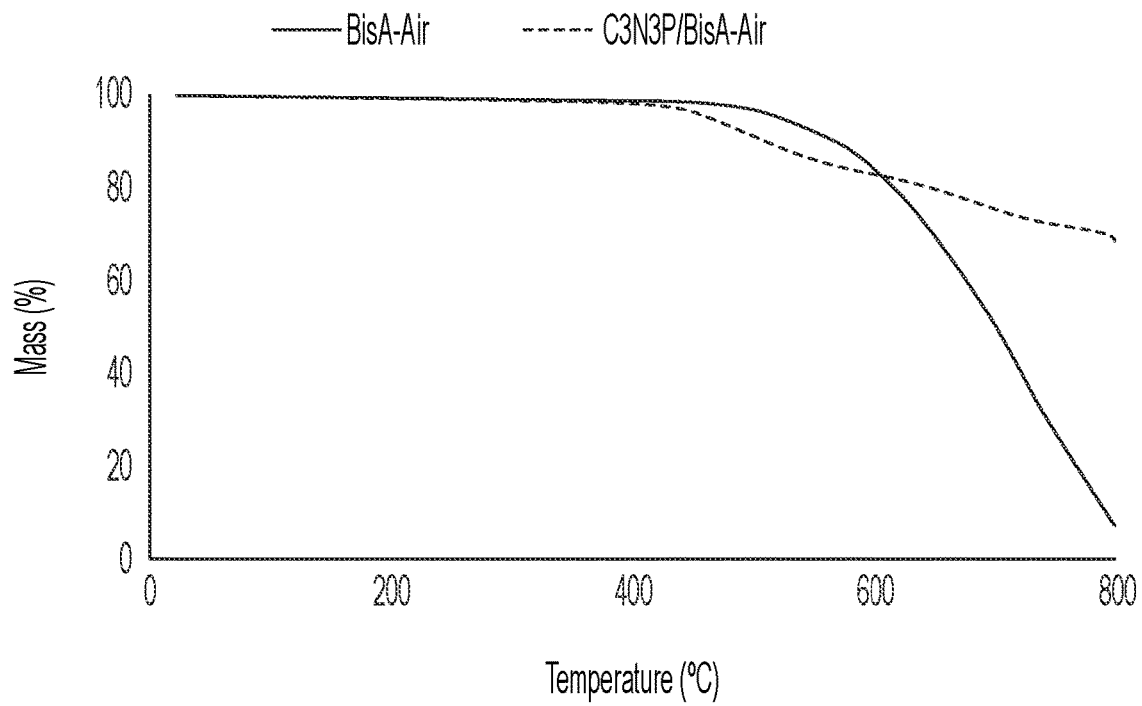
FIGS. 5A and 5B show data for $C_3N_3P$/BisA and pure BisA.

FIG. 5A provides data for TGA scans of 20% $C_3N_3P$/BisA and BisA under air with a heating rate of 10° C./min. According to this data, the $C_3N_3P$/BisA blend begins to lose mass when it is heated above 400° C., which is similar to the other CPN-doped BisA samples. As the temperature is increased, the sample showed a gradual mass loss and a char yield of 69.2% at 800° C. Given that this material has the same CPN loading and a similar char yield relative to the CPN-PP/BisA composite (Example 2) this measurement suggests that CPN phase and manner of processing has little effect on the oxidative stability at high temperatures.

Figure 5B:
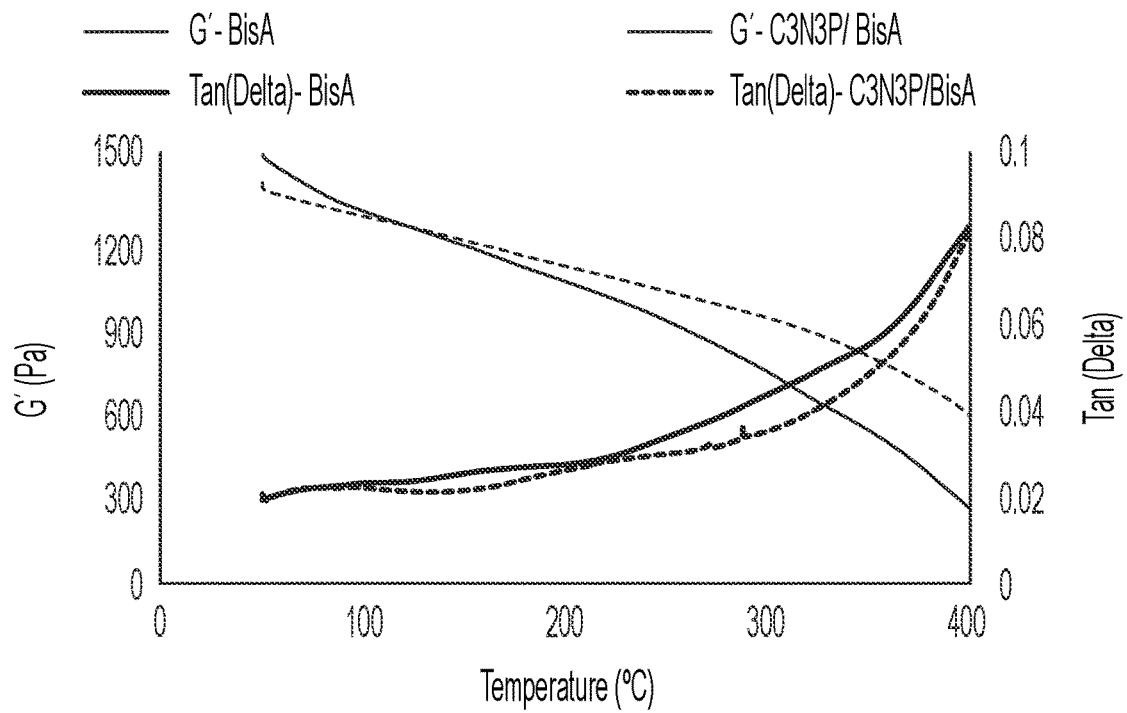

Dynamic mechanical measurements were used to measure the storage modulus (G') and tan (δ) of rectangular $C_3N_3P$/BisA composites and its pure BisA counterpart as a function of temperature. FIG. 5B shows measured storage modulus (G') and tan (δ) of rectangular $C_3N_3P$/BisA composites (strain rate=1%, heating rate=3° C./min). Comparison of G' shows that BisA initially has a larger storage modulus than $C_3N_3P$/BisA (1490 GPa vs. 1370 GPa). However, as the temperature is increased, the decrease in G' is much greater for BisA than $C_3N_3P$/BisA. These measurements suggest that incorporation of $C_3N_3P$ can prevent the erosion of storage modulus as a result of increasing temperature. Both composites have similar tan (δ) and indicate that there is no $T_g$ below 400° C.

Further Embodiments

Combinations of carbon phosphonitride and polymer resin are not limited to the examples provided. Carbon phosphonitride may be incorporated as either monomer ($P(CN)_3$), prepolymer (CPN-PP), or thermoset ($C_3N_3P$) into other polymers of varied composition and cure chemistry. In addition to phthalonitriles, cyanate esters, and epoxies, one may also utilize other cure chemistries, such as vulcanization (e.g., rubbers), UV-curing (e.g., acrylates), and ring-opening metathesis polymerization (ROMP, e.g., polydicyclopentadiene). Engineering thermoplastics such as PEEK (polyether ether ketone) or PAES (polyarylene ether sulfone) may also be used as matrices instead of thermosets.

It is expected that CPN-PP could be a useful additive in any number of phthalonitriles, for example those described in commonly-owned U.S. Pat. Nos. 8,735,532; 9,085,692; 8,921,510; 9,394,404; 9,464,170 and 9,920,165, and divisional patents thereof.

Beyond the acetonitrile used in the examples, glymes (such as dimethoxyethane) are also good solvents for CPN-PP. Other aliphatic nitriles such as such as adiponitrile and succinonitrile could also operate as solvents for CPN-PP.

Advantages

Phosphorus-containing fire retardant materials (P-FRs) have been extensively investigated as environmentally-friendly replacements for halogenated FRs, many of which are currently still in use. In particular, P-FRs are promising halogen-free candidates because they can suppress fire in both the gas and condensed phase. In the gas phase, non-combustible phosphorus species that are evolved during burning can act as a radical scavenger to prevent further degradation of the polymer. In addition, the inclusion of P-FRs within a polymer matrix can promote additional crosslinking of the polymer chains, thereby forming a carbonaceous char that reduces the production of volatiles. While the fire suppression mechanisms for P-FRs is well understood, considerable effort is now focused on preparing new heteroatom-containing derivatives to further improve performance. In particular, P—N fire suppressants exhibit better thermal stability and char formation, increasing the likelihood of preserving the matrix during combustion. Given their high P—N content and excellent char forming abilities, CPNs have good potential to improve the fire-resistance performance of various polymeric materials. CPNs also enjoy the benefits of being soluble in many thermosets and co-curing with some thermosetting groups (such as nitriles) for intimate mixing.

Traditional flame retardants are either leachable organic compounds, heterogeneous additives, or custom polymers requiring commercially unavailable monomer synthesis. CPN is a non-volatile, non-leachable, soluble additive that can be directly mixed with commercial thermosets.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention.

What is claimed is:

1. A material comprising:
a thermoset plastic mixed with a carbon phosphonitride (CPN), selected from the group consisting of CPN pre-polymer (CPN-PP), solid CPN ($C_3N_3P$), and combinations thereof, wherein the CPN is present in a range of about 2% to about 49% by weight.

2. The material of claim 1, wherein the thermoset plastic is in a condition of having been made from phthalonitrile resin, cyanate ester, or epoxy.

3. The material of claim 1, wherein the CPN pre-polymer (CPN-PP) is formed by reacting $PCl_3$ in the presence of AgCN and $AgNO_3$.

4. The material of claim 1, wherein the solid CPN($C_3N_3P$) is formed by heating tricyanophosphine $P(CN)_3$ from 175° C. to 225° C.

5. A method of making a thermoset material, the method comprising:

combining a carbon phosphonitride (CPN) selected the group consisting of CPN pre-polymer (CPN-PP), solid CPN($C_3N_3P$), and combinations thereof, with a resin to form a composite; and allowing the composite to cure into a thermoset material incorporating the CPN, wherein the CPN is present in a range of about 2% to about 49% by weight.

6. The method of claim 5, wherein the resin is selected from the group consisting of phthalonitrile resin, cyanate ester, or epoxy.

7. The method of claim 5, wherein the CPN pre-polymer (CPN-PP) is formed by reacting $PCl_3$ in the presence of AgCN and $AgNO_3$.

8. The method of claim 5, wherein the solid CPN($C_3N_3P$) is formed by heating tricyanophosphine $P(CN)_3$ from 175° C. to 225° C.

* * * * *